Patented Jan. 29, 1952

2,583,938

UNITED STATES PATENT OFFICE 2,583,938

METHOD OF PREPARING STABLE AERATED WAX COMPOSITIONS AND ARTICLES

August French, Hammond, Ind., assignor to Standard Oil Company, Chicago, Ill., a corporation of Indiana No Drawing. Application November 30, 1948, Serial No. 62,787

10 Claims. (Cl. 18—58)

This invention relates to improvements in the preparation of wax compositions, and more particularly relates to improvements in preparing aerated wax stock for the manufacture of wax articles, particularly molded candles.

In the manufacture of certain types of wax figures such as candles, it is desirable to employ waxes which have an opaque appearance. In the past, materials, such as stearic acid, beta naphthol, ammonium stearate, naphthyl benzoate and other compounds, have been used as opacifiers in wax. However, since such materials must be used in relatively large amounts to obtain the desired opaqueness, certain other desirable properties of the wax are adversely affected. Furthermore, the necessity of using such large amounts of the additives makes the use thereof for this purpose economically unattractive.

Another method employed to obtain opaque wax mixtures is to introduce air into molten paraffin wax or mixtures of paraffin wax and stearic acid. However, considerable difficulty is encountered in handling aerated paraffin wax or aerated mixtures of paraffin wax and stearic acid since they are unstable in that they have a tendency to break down and revert to the original state, or to become so stiff that they will not readily flow. In addition, such aerated waxes cannot be pumped or otherwise moved through pipes since the aerated waxes readily break down on being so handled.

The object of the present invention is, therefore, to provide a stable, aerated wax mixture. Another object of the invention is to provide a stable, emulsified, aerated wax mixture, which can be pumped without breaking. A further object of the invention is to provide a stable, white, opaque aerated wax mixture suitable for use in the manufacture of candles and wax figures. Still another object of the invention is to provide a stable, white, cream-like aerated wax mixture which is suitable for use in the making of molded candles. Still another object of the invention is to provide an improved stable, white, opaque wax candle stock. Another object of the invention is to provide a decorative candle of improved appearance.

In accordance with the present invention, stable, cream-like, emulsified, aerated wax mixtures suitable for the manufacture of wax articles, such as molded candles, dipped candles, novelty figures, and the like, are obtained by aerating, under controlled conditions, a mixture comprising essentially a paraffin wax having a melting point of from about 120° F. to about 140° F., and particularly, from about 125° F. to about 135° F., and from about 0.5% to about 25%, and preferably from about 1% to about 15% (by weight) of a high melting point micro-crystalline wax having a melting point above 145° F., for example, of from about 145° F. to about 200° F., and preferably from about 160° F. to about 200° F. The high melting point wax is suitably a substantially oil free wax of high melting point, and which will begin to precipitate out of a 5% solution in paraffin wax when the temperature of the mixture is lowered to below about 165° F.

The term "melting point" as used in the specification and claims refers to that temperature at which a drop of molten wax solidifies and adheres to and rotates with the bulb of a rotated thermometer after withdrawing said thermometer bulb from a body of the molten wax.

The term "paraffin wax" used herein designates the straight chain paraffin hydrocarbons ranging in melting point from about 120° F. to about 140° F. They crystallize in the form of large, thin plates and are obtained from light paraffin oil distillates of mixed base or paraffin base crude oils.

By the present refining methods, the crude oil is subjected to distillation whereby it is separated into a series of fractions known as "paraffin distillates." The paraffin wax is separated from the paraffin distillates by chilling to a low temperature, which may be below freezing, and then filtering the solid wax from the oil. Generally, filter presses are used to separate the paraffin wax from the oil. The wax collected on the filter press is generally referred to as "slack wax" and it contains a large quantity of oil. The oil is usually removed from the slack wax by subjecting it to a "sweating operation," usually after redistilling. The wax may be further refined by any of the conventional refining processes such as the treatment with sulfuric acid or percolation through clay. The resulting product is known as paraffin wax and has a melting point of from about 120° F. to 140° F.

The high melting point waxes which can be suitably used in the present invention are beeswax, mineral waxes, such as for example, ozokerite, ceresin, and montan wax, vegetable waxes, such as for example, candelilla wax, bayberry wax and carnauba wax, and micro-crystalline petroleum waxes having melting points within the range of about 145° F. to about 200° F., as well as synthetic waxes which are insoluble in paraffin wax at temperatures slightly above i. e., 5° F., the melting point of the latter.

Of the high melting point waxes, I prefer to use the high melting point micro-crystalline petroleum waxes. Such waxes have very small and often ill-defined crystals, and are sometimes referred to as mal-crystalline waxes, petrolatum wax, or amorphous waxes.

The micro-crystalline waxes are residual waxes of low oil content, usually containing less than 2% oil, obtained from reduced crude oils in the manufacture of bright stock, and from tank bottoms, particularly the high melting point fractions obtained from residual waxes. These waxes vary in melting points from 150° F. to about 200° F., and are typified by a very small needle crystal structure, and are believed to be composed of highly branched compounds, cyclic compounds and compounds which have the property of modifying the crystal structure of the wax. Such waxes have a molecular range of approximately $C_{44}$ to $C_{56}$ or higher, and have Saybolt Universal viscosities ranging from about 60 to about 100 seconds at 210° F.

The micro-crystalline petroleum waves can be obtained by further reducing an acid-treated reduced crude oil to obtain an overhead lubricating oil distillate fraction and a bottoms or residual fractions. The latter, containing the high melting waxy components of the oil, is repeatedly diluted with naphtha or other hydrocarbon solvent and the precipitated wax settled and/or centrifuged until a finished wax product of the desired melting point is obtained.

Another high melting point petroleum wax which can be used is the high melting point petroleum wax obtained from heavy lubricating oil distillates from wax-bearing crude oils. These waxes are obtained from acid-treated heavy lubricating oil distillates by diluting same with a diluent, such as naphtha, and chilling the mixture to a temperature of about —25° F. to precipitate wax therefrom which is removed by suitable means, such as filter pressing. This wax, called slack wax, has a melting point of about 145° F. and contains about 50% oil. The slack wax is then dissolved in a solvent such as oleum spirits and chilled to about 70° F. to crystallize therefrom a paraffin wax having a melting point of about 170° F. to about 175° F. This wax is then redissolved in the oleum spirits or other suitable solvent and the mixture brought to a temperature of about 90° F. to 100° F., at which temperature wax is precipitated and removed by filter pressing. The wax so recovered has a crystalline structure, a melting point of 180° F. to 185° F., and an oil content of less than about 1% after removal of the solvent.

The aerated wax emusion of the present invention is prepared by melting a mixture of paraffin wax of about 120° F. to about 140° F. melting point, and from about 0.5% to about 25% of a substantially oil-free micro-crystalline wax having a melting point of above about 145° F., preferably of about 170° F. to about 200° F., cooling the molten wax mixture to a temperature of about 160° F. to about 170° F., and then continuing the lowering of the temperature of wax mixture to about 3° F. to 4° F. above the melting point of the paraffin wax component of the mixture while continually stirring the cooling mixture with a high speed propeller stirrer, and introducing a gaseous medium thereinto. Gaseous media, such as air, oxygen, carbon dioxide, nitrogen dioxide, etc., can be used, although I prefer to employ air, which can be introduced into the cooling mixture by using a high speed propeller stirrer which exhibits a vortex action, whereby air is dispersed throughout the mixture. As the temperature of the wax mixture falls to within 3° F. to 4° F. above the melting point of the paraffin wax, the air bubbles are broken up or cut up by the shearing action of the propeller blades and a dispersion obtained of very fine gas bubbles, such as air bubbles, in the wax.

The resultant product is a cream-like aerated wax emulsion of which about 10% to about 50%, and preferably from about 15% to about 35% of its volume is the aerating medium, for example air. The product is stable and free-flowing when maintained at a temperature of about 3° F. to 4° F. above the melting point of the paraffin wax component of the mixture.

The following example is illustrative of the method of preparing an aerated wax emulsion in accordance with the present invention:

A wax mixture comprising essentially a paraffin wax of about 130° F. melting point and 5% of a substantially oil-free petroleum micro-crystalline wax of about 180° F. melting point was heated to a temperature of about 165–170° F., at which temperature the high melting micro-crystalline wax was completely in solution in the paraffin wax. As the mixture cooled, the micro-crystalline wax precipitated out in the form of fine silk-like crystals which remained suspended in the liquid paraffin wax. This suspension was then subjected to intense stirring with a high speed propeller stirrer, which exhibited a vortex action and dispersed air throughout the mixture. As the temperature dropped to within 3° F. to 4° F. above the melting point of the paraffin wax, i. e., to about 133° F.–134° F., the coarser air bubbles were subjected to the shearing action of the propellers and a very fine dispersion formed. The mixture had the appearance and fluidity of milk and was perfectly stable at a temperature of about 133° F.–134° F.

In preparing aerated wax emulsions, for example, air-wax emulsions, the two waxes, in the desired proportions, are placed in a tank or kettle having suitable heating and cooling means and the waxes heated to a temperature above about 165° F., at which temperature the higher melting micro-crystalline wax will be in solution in the lower melting paraffin wax. The heated wax mixture is then cooled to a temperature within about 3° F. to 4° F. above the melting point of the paraffin wax and stored at this temperature until needed. The tank or kettle should be provided with a slow speed stirrer adapted to scrape the vessel walls so that any wax precipitated thereon as the wax mixture is being cooled can be scraped off and mixed with the body of the wax mixture. To insure uniformity of the wax slurry, it is preferably recirculated by means of a circulating pump.

If the white, opaque, stable, air-wax emulsion is to be used, as for example, in the making of candles, the wax slurry, while maintained at a temperature of about 3° F. to 4° F., above the melting point of the paraffin wax component, is emulsified by means of a high speed stirrer having considerable shearing action while air is being introduced into the wax by vortexing, induced by the rapidly moving stirrer or propeller. When the air-wax emulsion reaches the desired consistency and opaqueness, it may be pumped to the candle molds or introduced into the candle molds by gravity feed. In order that the air-wax emulsion can be maintained at a temperature of 3° F. to 4° F., above the melting point of the paraffin wax used as it is being pumped through the lines of the molds, it is desirable that the lines be heated and maintained at the desired temperature by electrical heating means, provided with suitable electronic temperature controlling devices well known in the art.

Heretofore, novelty candles have been made by casting hollow shells of wax-stearic acid mixture, and then removing the liquid wax mixture from the center portion of the figure by pouring or other means. The shells thus formed are allowed to cool completely in the molds, removed therefrom and filled with a wax or wax material in a semi-solid state, such as for example, the unstable air-wax mixtures. The novelty candles have been made in this manner heretofore, the economic reasons, since less of the costly stearic acid is used, and the candles, if made from solid wax would have to be topped with molten wax several times due to the shrinkage of the wax.

When employing the air-wax emulsion of the present invention, the novelty candles or other wax articles can be molded as solid figures since no stearic acid is used, which would increase the cost of the articles; topping becomes unnecessary since the air-wax emulsion does not exhibit the marked shrinkage of the wax-stearic acid mixture; and finally, since my improved mixture of air, micro-crystalline wax and paraffin wax is more uniform and stable with respect to retention of air than prior air-wax mixtures containing no micro-crystalline wax. In making solid novelty candles with air-wax emulsion of the herein-described invention the molding time can be materially reduced by removing the air-wax emulsion from the molds while still incompletely solidified and then completing the solidification by cooling with refrigerated air or by passing the candles on a conveyor through a water bath.

If desired, hollow shells may be cast of the stable air-wax emulsion of the present invention, removed from the molds, and filled with wax or ordinary air-wax mixture.

Another method of utilizing the aerated wax emulsion, such as air-wax emulsions of the present invention, particularly for use in the manufacture of candles, wax figures, etc., is to permit the emulsion to solidify in suitable containers or chilled on refrigerated drums, and the solidified material subsequently broken up and/or ground to small particles of uniform size. These fragments of solid air-wax emulsion can then be carefully heated to temperatures of about 90° F. to about 115° F. by suitable means such as infrared lamps, dielectric heating, etc., at which temperature it becomes plastic and flows under moderate pressure. In this state the air-wax material can be pressed into the cavities of molds and "welded" together under these conditions to give perfect impressions similar in appearance to figures cast from hot fluid air-wax emulsions.

Another method of applying the air-wax emulsion of the present invention for molding candles or other wax articles is to cool the air-wax emulsion to a temperature below the melting point of the paraffin wax component until the mixture is of such consistency that pressure must be exerted to cause it to flow. The material in this state can then be extruded into suitable molds.

If desired, the air-wax emulsion can be colored with suitable coloring materials, as well as scented with various perfumes.

The advantages of employing the air-wax emulsion of the present invention for the fabrication of wax articles are numerous. For example, the need for stearic acid, a very expensive component of the wax-stearic acid mixture heretofore used, is removed. Wax articles made in accordance with the present invention have a much improved appearance because of the higher opacity and whiteness they are more easily decorated by spraying due to the better visibility of the color being applied, and hence the tendency to overspray is reduced; the paint or other coloring material applied adheres more tenaciously to the air-wax emulsion of the present invention. The articles so made are more resistant to the effects of high temperatures, removing the tendency to wilt. When used in making castings or molds the air-wax emulsion is more readily removed from the molds than is the stearic acid-wax mixture and the air-wax emulsion has a lesser tendency to form "flash" at the parting lines.

While I have described my invention in detail with the inclusion of certain specific embodiments, no undue limitations are thereby intended other than those imposed by the appended claims.

I claim:

1. The method of preparing a stable opaque aerated free-flowing emulsion-like wax composition comprising heating at a temperature of above about 165° F., a wax mixture, free of an added froth stabilizer, and consisting essentially of a paraffin wax having a melting point of from about 120° F. to about 140° F., and from about 0.5% to about 25%, by weight, of a micro-crystalline wax having a melting point above about 145° F., cooling the heated mixture to a temperature of about 3° F. to about 4° F., above the melting point of the paraffin wax component of said wax mixture, while vigorously stirring and introducing a gaseous medium into said cooling wax mixture, and maintaining the resultant free-flowing aerated emulsion-like wax composition at a temperature of about 3° F. to about 4° F. above the melting point of the paraffin wax component of said composition during storage and transportation to a location where solidification of the aerated emulsion-like wax composition is effected.

2. The method of preparing a stable opaque free-flowing aerated wax stock comprising heating to a temperature above about 165° F., a wax mixture, free of an added froth stabilizer, and consisting essentially of a paraffin wax having a melting point of from about 120° F. to about 140° F., and from about 0.5% to about 25%, by weight, of a micro-crystalline wax having a melting point above about 145° F., cooling the heated mixture to a temperature of about 3° F. to about 4° F. above the melting point of the paraffin wax component of said mixture, agitating said cooling wax mixture with a high speed stirrer having a vortexing action, whereby air is dispersed in said mixture, and maintaining the resultant free-flowing emulsion-like wax composition at a temperature of about 3° F. to about 4° F. above the melting point of the paraffin wax component of said mixture, during storage and transportation to a point where solidification of the emulsion-like wax composition is effected.

3. The method of claim 2 in which the micro-crystalline wax is a micro-crystalline petroleum wax having a melting point of from about 150° F. to about 200° F.

4. The method of claim 2 in which the micro-crystalline wax is a mineral wax having a melting point above about 145° F.

5. The method of claim 2 in which the microcrystalline wax is a vegetable wax.

6. The method of claim 2 in which the microcrystalline wax is carnauba wax.

7. The method of preparing a molded opaque wax article comprising heating to a temperature above about 165° F. a wax mixture, free of an added froth stabilizer, and consisting essentially of a paraffin wax having a melting point of from about 120° F. to about 140° F., and from about 0.5% to about 25%, by weight, of a microcrystalline wax having a melting point above about 145° F., cooling the heated mixture to a temperature within 3° F. to about 4° F. above the melting point of the paraffin wax component of said mixture while stirring vigorously and introducing a gaseous medium in said cooling wax mixture, whereby a stable opaque aerated free-flowing emulsion-like wax composition is obtained, transporting to a mold said stable aerated free-flowing emulsion-like wax composition while maintained at a temperature of 3° F. to 4° F. above the melting point of the paraffin wax component of said emulsion-like wax composition, and permitting said emulsion-like wax composition to solidify in said mold.

8. The method of claim 7 in which the paraffin wax has a melting point of about 125° F. to about 135° F., and the micro-crystalline wax is a petroleum micro-crystalline wax having a melting point of from about 150° F. to about 200° F.

9. The method of claim 7 in which the gaseous medium is air.

10. The method of claim 7 in which from about 10% to about 50% of the volume of the emulsion-like wax composition is the gaseous medium.

AUGUST FRENCH.

REFERENCES CITED

The following references are of record in the file of this patent:

UNITED STATES PATENTS

| Number | Name | Date |
| --- | --- | --- |
| 1,908,044 | Nelson | May 9, 1933 |
| 2,185,046 | Voorhees | Dec. 26, 1939 |
| 2,434,557 | Fox et al. | Jan. 13, 1948 |
| 2,443,221 | Bergstein | June 15, 1948 |